(12) United States Patent
Greiner et al.

(10) Patent No.: US 9,307,234 B1
(45) Date of Patent: Apr. 5, 2016

(54) INTERACTIVE LATENCY CONTROL WITH LOSSLESS IMAGE OPTIMIZATION

(71) Applicant: American Express Travel Related Services Company, Inc., New York, NY (US)

(72) Inventors: Hans-Jurgen Greiner, Desert Hills, AZ (US); Vasif M. Pasha, Scottsdale, AZ (US); Kevin H. Ringger, Surprise, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 14/339,308

(22) Filed: Jul. 23, 2014

(51) Int. Cl.
*H04N 5/232* (2006.01)
*H04N 19/156* (2014.01)
*H04W 24/08* (2009.01)

(52) U.S. Cl.
CPC ..... *H04N 19/00206* (2013.01); *H04N 5/23229* (2013.01); *H04W 24/08* (2013.01)

(58) Field of Classification Search
CPC combination set(s) only.
See application file for complete search history.

(56) References Cited

U.S. PATENT DOCUMENTS

| 8,856,371 B2 * | 10/2014 | Kariti et al. ............. 709/231 |
| 2004/0240752 A1 * | 12/2004 | Dobbs et al. ............. 382/276 |
| 2008/0034104 A1 * | 2/2008 | Kariti et al. ............. 709/231 |
| 2008/0192129 A1 * | 8/2008 | Walker ............. G11B 27/034 348/231.2 |
| 2013/0215295 A1 * | 8/2013 | Baek et al. ............. 348/240.99 |

* cited by examiner

*Primary Examiner* — Nicholas Giles
(74) *Attorney, Agent, or Firm* — Snell & Wilmer L.L.P.

(57) ABSTRACT

The system may capture an image comprising an original image size. The system may further determine an optimal size for the image based on a connection bandwidth and/or connection latency. The system may also compress the image to reduce an image size locally until the image size is less than or equal to the optimal size, before transmitting the image with the optimal size to the receiver while controlling latency in image transmission.

17 Claims, 3 Drawing Sheets

INTERACTIVE LATENCY CONTROL WITH LOSSLESS IMAGE OPTIMIZATION

FIELD

The present disclosure relates to image compression and transmission, and more particularly, to compression of images for rapid transmission and display on a mobile device.

BACKGROUND

Communication protocols used to transmit data over the web and/or mobile networks may achieve reliable data delivery and congestion control, both of which come at a cost. Interactive latency is often significantly large and leads to time-consuming image transmission and inconsistent transmission rates. Images from mobile devices may also transmit particularly slowly due to the constraints of the networks that the mobile device uses to transmit data.

SUMMARY

The system may comprise a mobile device capturing an image having an original image size. The mobile device may determine an optimal size for the image based on a connection bandwidth and/or a connection latency. The mobile device may compress the image to reduce an image size until the image size is less than or equal to the optimal size. The mobile device may also transmit the image comprising the optimal size.

In various embodiments, system may further comprise the mobile device receiving the image comprising the optimal size from a web server. The mobile device may receive the image comprising the optimal size from a second mobile device. The mobile device may display the image comprising the optimal size. The mobile device may measure the bandwidth and/or connection latency with a web server, and determine the optimal size to complete a transmission of the image, within a predetermined time, based on the bandwidth and/or connection latency.

The mobile device may measure the bandwidth and/or connection latency of a connection with a second mobile device, and determine the optimal size to complete a transmission of the image within a predetermined time based on the bandwidth and/or connection latency. The optimal size may be between about 40% and 95% of the original file size.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
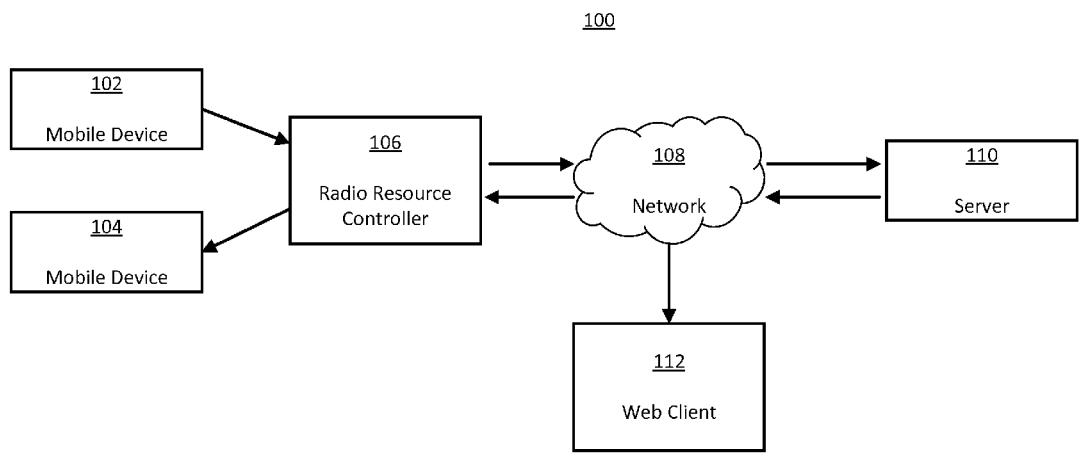
FIG. 1A illustrates a system for transmitting and receiving optimal images between a mobile device and a server, in accordance with various embodiments.

In various embodiments, and with reference to FIG. 1A, system 100 may be capable of transmitting and receiving optimized images between one or more mobile devices (e.g., a mobile device 102, a mobile device 104, and/or the like) and a server 110. System 100 may comprise one or more mobile device (e.g., mobile device 102, mobile device 104, and/or the like), a radio resource controller 106, a network 108, a server 110, and a web client 112.

As used herein, "transmit" may include sending electronic data from one system component to another over a network connection. Additionally, as used herein, "data" may include encompassing information such as commands, queries, files, data for storage, and the like in digital or any other form.

In various embodiments, mobile device 102 and mobile device 104 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) tablets, wearables (e.g., smart watches and smart glasses), or any other device capable of receiving data over network 108.

Network 108 may comprise any electronic communications system or method which incorporates software and/or hardware components. Communication may be accomplished through any suitable communication channels, such as, for example, a telephone network, an extranet, an intranet, Internet, point of interaction device (point of sale device, personal digital assistant, smart phone, cellular phone (e.g., iPhone®, Palm Pilot®, Blackberry®), kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although a network 108 may be described herein as being implemented with TCP/IP communications protocols, the network 108 may also be implemented using IPX, Appletalk, IP-6, NetBIOS, OSI, any tunneling protocol (e.g. IPsec, SSH), or any number of existing or future protocols. If the network 108 is in the nature of a public network, such as the Internet, it may be advantageous to presume the network 108 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components described herein may be independently, separately or collectively coupled to the network 108 via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network 108 may be implemented variously. For example, network 108 may be implemented as an interactive television (ITV) network. The systems and methods disclosed herein contemplate the use, sale and/or distribution of any goods, services or information over any network having functionality similar to that described above with reference to network 108.

Figure 1B:
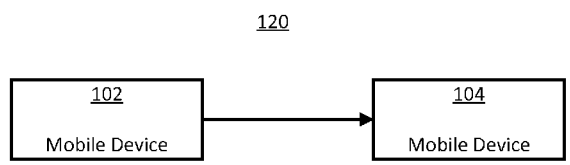
FIG. 1B illustrates a system for transmitting and receiving optimal images between mobile devices, in accordance with various embodiments.

In various embodiments, and with reference to FIG. 1B, system 120 may be capable of transmitting and receiving optimized images between mobile devices. System 120 may include mobile device 102 and mobile device 104. Mobile device 102 may establish a connection (e.g., direct connection) with mobile device 104. For example, mobile device 102 and mobile device 104 may comprise any device capable of transmitting and/or receiving a signal wirelessly to a network or another device. In various embodiments, such a signal may comprise a BLUETOOTH signal utilizing one or more communication protocols over a connection between BLUETOOTH enabled mobile devices. The signal may also comprise a near-field communication (NFC) signal, RF communication signal, or other communication signal capable of direct communication between mobile devices.

Figure 2:
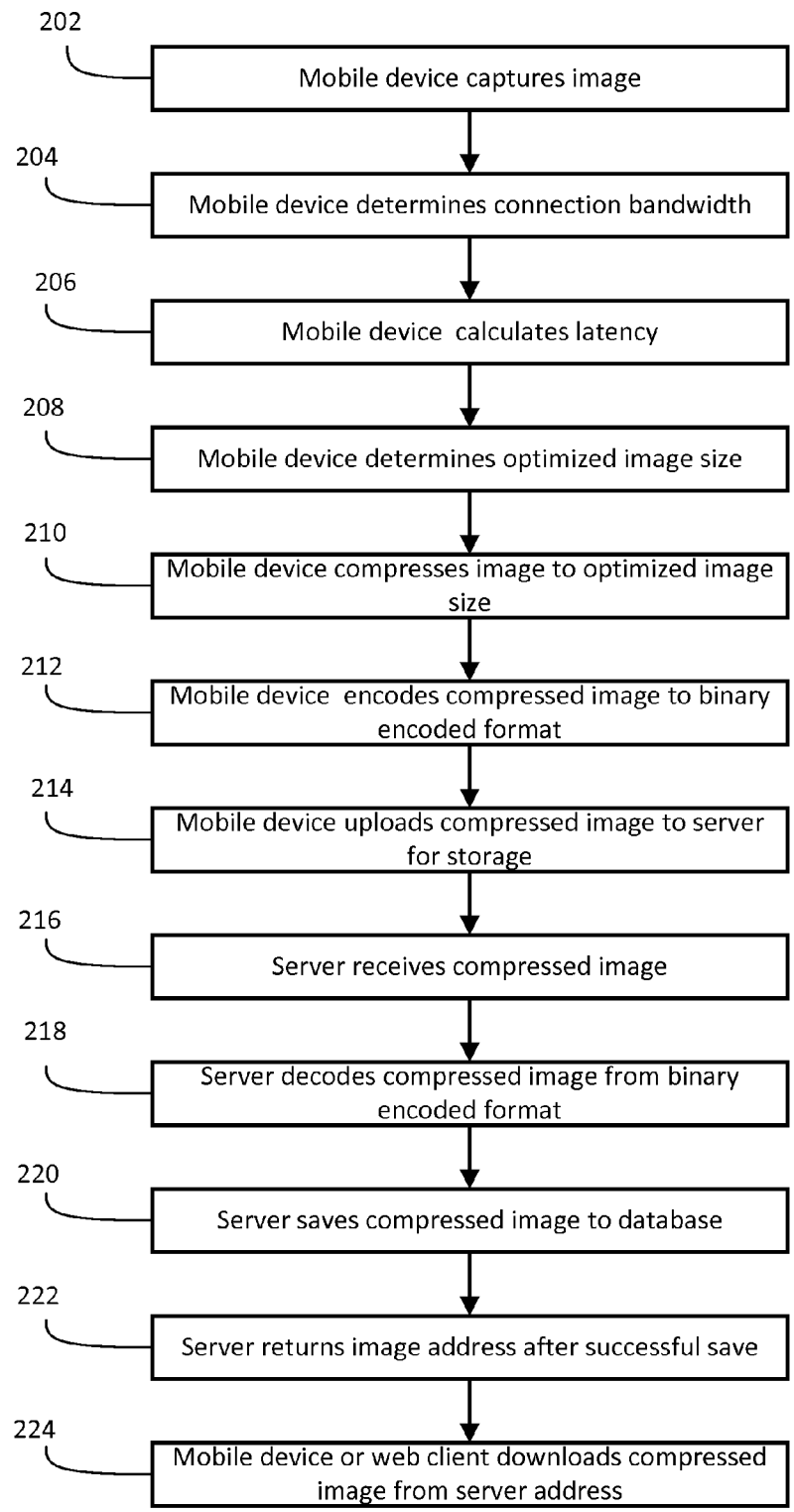
FIG. 2 illustrates a process for compressing an image on a mobile device prior to transmitting the image to a server, in accordance with various embodiments.

In various embodiments, and with reference to FIG. 2, system 100 and/or system 120 may be capable of performing operations and/or steps of method 200. In this regard, method 200 may include operations and/or steps for compressing an image on mobile device 102 (e.g., prior to transmitting the image). Mobile device 102 may capture an image (Step 202). Mobile device 102 may capture the image using an integrated camera or sensor to create a digital image file. Mobile device 102 may also capture the image by receiving the image from a source such as an MMS message, a web site, an email, server 110, or mobile device 104.

In various embodiments, mobile device 102 may determine a connection bandwidth (Step 204). Mobile device 102 may determine the connection bandwidth of a connection to be used for uploading or sending an image. For example, mobile device 102 may be configured to upload an image to a selected server 110. Mobile device 102 may initiate a connection with the server 110 and measure the bandwidth of the connection to the selected server 110.

As used herein, the term "bandwidth" may include a measurement of available communication resources. The bandwidth of a connection may be expressed, for example, as a bit rate.

In various embodiments, mobile device 102 may be capable of determining connection latency (i.e. time between sending a signal and receiving a response). Mobile device 102 may determine the connection latency of a connection to be used for uploading or sending an image. For example, mobile device 102 may be configured to upload an image to a server 110. Mobile device 102 may initiate a connection with server 110 and measure the latency of the connection between the mobile device 102 and server 110 as a half second.

In various embodiments, mobile device 102 may determine the optimal file size (Step 208). Mobile device 102 may consider the measured bandwidth of the connection to server 110 (e.g., as provided for in Step 204) and/or the measured latency of the connection to server 110 (e.g., as provided for in Step 206) to determine the optimal file size. Mobile device 102 may also consider a targeted upload time to determine the optimal file size. For example, mobile device 102 may measure the bandwidth of the connection to transmit an image at 250 kilobits per second (kb/s) and have a targeted upload time of 2 seconds. The optimal file size would then be 1,000 kb or smaller. Thus, the optimal file size may be calculated as the amount of data mobile device 102 can send within the targeted upload time. The optimal file size may also be a fixed size reduction of the original file size. For example, optimal file size may be in the range of about 40% to about 70% smaller than the original file size. The optimal file size may also be in the range of about 70% to about 97% smaller than the original file size. As mobile devices become equipped to take more detailed photographs with larger megapixel cameras (increasing original file size), the percent reduction from original file size to optimal file size may further increase.

In various embodiments, mobile device 102 may compress the image until the image is the optimal file size (Step 210). Mobile device 102 may implement recursive techniques to compress the image and provide a manageable code base with the recursion stopping in response to the compressed image size being substantially equal to or less than the optimal file size. Mobile device 102 may also implement linear techniques to compress the image with the compression stopping in response to the compressed image size being substantially equal to or less than the optimal file size. For example, if mobile device 102 has an image with a size of about 640 kB, the optimal file size may be about 40% of the original file size, or about 256 kB. Mobile device 102 may then continue to compress the image file until the image file size is less than or equal to about 256 kB. In another example, if mobile device 102 has an image with a size of about 640 kB the optimal file size may be about 5% of the original file size (a 95% reduction), or about 32 kB. Mobile device 102 may recursively compress the approximately 640 kB image file until the image file size is less than or equal to the optimal file size of about 32 kB.

In various embodiments, mobile device 102 may encode the compressed image to a binary encoded format to prepare for transmission (Step 212). The binary encoded format may include Base64, yEnc, Ascii85, or any other encoding format to prepare the data for transmission. Mobile device 102 may upload the compressed image to server 110 for storage (Step 214). Server 110 may receive the compressed image (Step 216). Server 110 may further decode the compressed image from the binary encoded format (Step 218). In response to decoding the compressed image, server 110 may save the compressed image (step 220).

In various embodiments, server 110 may return an address for the compressed image in response to a successful save (Step 222). For example, server 110 may return a URL for the stored image to mobile device 102. Mobile device 102, mobile device 104, or web client 112 may download the compressed image file from the address provided by server 110 (Step 224). Mobile device 102, mobile device 104, or web client 112 may further display the compressed image without further decompression or with minimal decompression. By compressing the image at mobile device 102, prior to transmitting or uploading the image, mobile device 102 may upload the image in less time. The compressed image looks substantially the same as the original image when rendered on mobile device 102 or mobile device 104 due to the small screen size of mobile device 102 and mobile device 104. The reduced upload time of the compressed image file may be perceived by a mobile device user as a faster connection with limited degradation in perceived image quality.

Figure 3:
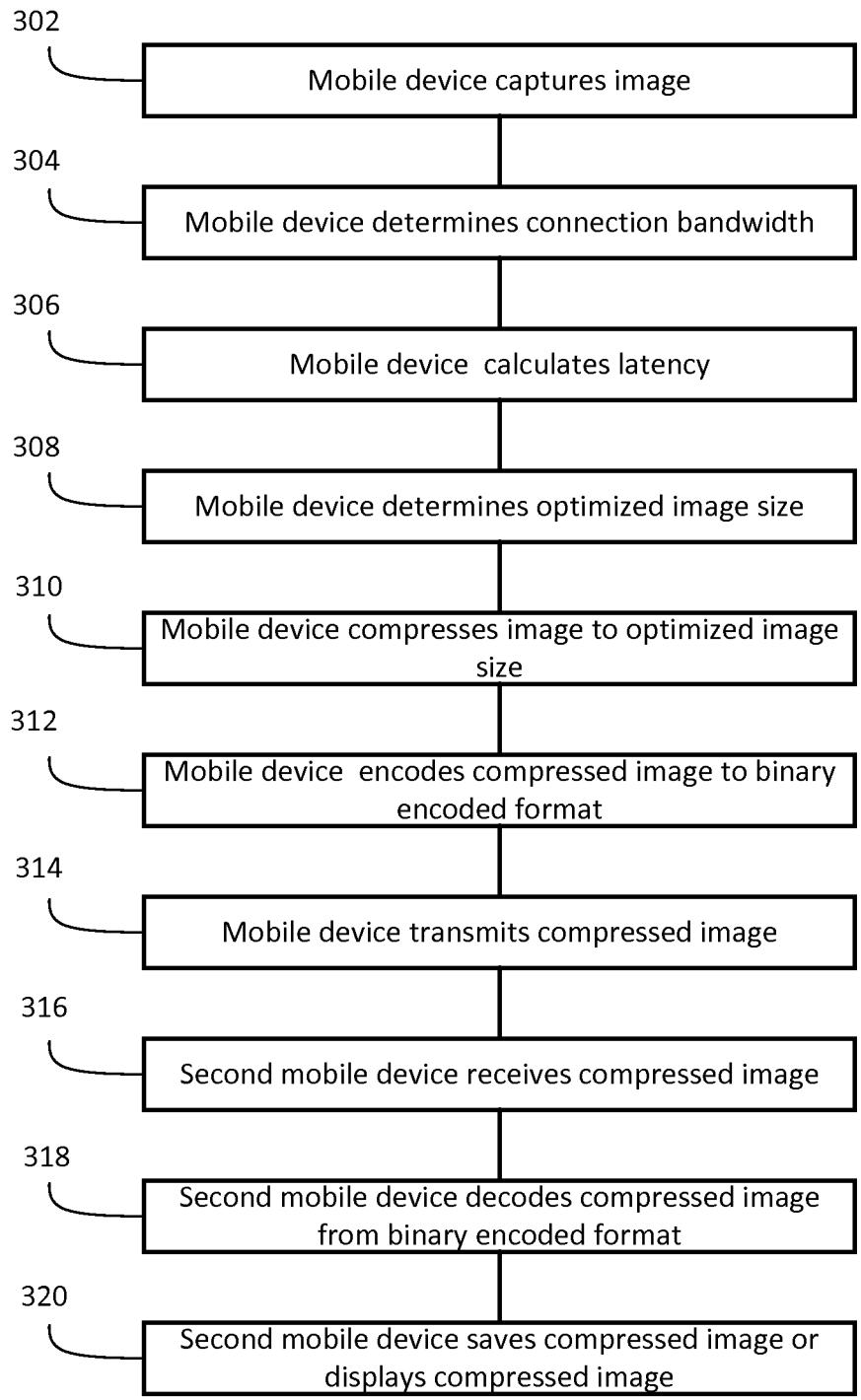
FIG. 3 illustrates a process for compressing an image on a mobile device prior to transmitting the image to another mobile device, in accordance with various embodiments.

In various embodiments, and with reference to FIG. 3, system 100 and/or system 120 may be capable of performing operations and/or steps of method 300. In this regard, method 300 may include operations and/or steps for compressing an image on mobile device 102 prior to transmitting the image to another mobile device 104. Mobile device 102 may capture an image. Mobile device 102 may capture the image using an integrated camera or sensor to create a digital image file (Step 302). Mobile device 102 may also capture the image by receiving the image from a source such as an MMS message or from a transmission from a server 110.

In various embodiments, mobile device 102 may determine a connection bandwidth (Step 304). Mobile device 102 may determine the connection bandwidth of a connection to be used for uploading or sending an image. For example, a mobile device 102 may be configured to directly transfer an image to another mobile device 104. Mobile device 102 may initiate a connection with the mobile device 104 and measure the bandwidth of the connection between the mobile devices.

In various embodiments, mobile device 102 may determine connection latency, or time between sending a signal and receiving a response (Step 306). Mobile device 102 may determine the connection latency of a connection to be used for uploading or sending an image. For example, mobile device 102 may be configured to upload an image to another mobile device 104. Mobile device 102 may initiate a connection with mobile device 104 and measure the latency of the connection between the mobile devices as a tenth of a second.

In various embodiments, mobile device 102 may determine the optimal file size (Step 308). Mobile device 102 may consider the measured bandwidth (from step 304) or the measured latency (from step 306) to determine the optimal file size. Mobile device 102 may also consider a targeted upload time to determine the optimal file size. For example, if mobile device 102 measures the bandwidth of the connection to transmit an image at about 250 kilobits per second (kb/s) and has a targeted upload time of about 2 seconds then the optimal file size may be about 1,000 kb or smaller. Thus, the optimal file size may substantially equal the amount of data mobile device 102 can send within the targeted upload time. The optimal file size may also be a set size reduction from the original file size. For example, optimal file size may be in the range of about 40% to about 70% smaller than the original file size. The optimal file size may also be in the range of about 70% to about 97% smaller than the original file size. As mobile devices become equipped to take more detailed photographs with larger megapixel cameras (increasing original file size), the percent reduction from original file size to optimal file size may further increase.

In various embodiments, mobile device 102 compresses the image until the image is the optimal file size (Step 310). Mobile device 102 may implement recursive techniques to compress the image or otherwise reduce the image file size and provide a manageable code base with the recursion stopping once the compressed image size is substantially equal to or less than the optimal file size. Mobile device 102 may also implement linear techniques to compress the image with the compression stopping once the compressed image size is substantially equal to or less than the optimal file size. For example, if mobile device 102 has an image with a size of about 640 kB the optimal file size may be about 40% of the original file size (a 60% reduction), or about 256 kB. Mobile device 102 may recursively compress the approximately 640 kB image file until the image file size is less than or equal to the optimal file size of about 256 kB. In another example, if mobile device 102 has an image with a size of about 640 kB the optimal file size may be about 5% of the original file size (a 95% reduction), or about 32 kB. Mobile device 102 may recursively compress the approximately 640 kB image file until the image file size is less than or equal to the optimal file size of about 32 kB.

In various embodiments, mobile device 102 encodes the compressed image to a binary encoded format to prepare for transmission (Step 312). The binary encoded format may include Base64, yEnc, Ascii85, or any other encoding format that prepares data for transmission over channels that do not allow binary data. Mobile device 102 transmits the compressed image to mobile device 104 for storage and/or rendering (Step 314). Mobile device 104 receives the compressed image (Step 316). Mobile device 104 decodes the compressed image from the binary encoded format (Step 318). Mobile device 104 may save, render, or further transmit the compressed image in step 320.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer®, Mozilla Firefox®, Google® Chrome, Apple® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

Phrases and terms similar to an "item" may include any good, service, information, experience, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touchtone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, solid-state storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    capturing, by a mobile device, an image comprising a file size;
    determining, by the mobile device, an optimal file size for the image based on at least one of a connection bandwidth or a connection latency between the mobile device and a server;
    compressing, by the mobile device, the image into a compressed image having a compressed file size less than or equal to the optimal file size;
    transmitting, by the mobile device, the compressed image to the server for storage;
    receiving, by the mobile device, an address of the compressed image from the server;
    downloading, by the mobile device, the compressed image from the address received from the server; and
    displaying, by the mobile device, the compressed image.

2. The method of claim 1, further comprising receiving, by the mobile device, the compressed image, wherein the compressed image is transmitted by the server.

3. The method of claim 1, further comprising receiving, by the mobile device, the compressed image, wherein the compressed image is transmitted by a second mobile device.

4. The method of claim 1, wherein the determining the optimal file size further comprises:
    measuring, by the mobile device, the at least one of connection bandwidth or connection latency of a connection with the server; and
    determining, by the mobile device, the optimal file size to complete a transmission of the image within a predetermined time based on the at least one of connection bandwidth or connection latency.

5. The method of claim 1, wherein the determining the optimal file size further comprises:
    measuring, by the mobile device, the at least one of connection bandwidth or connection latency of a direct connection with a second mobile device; and
    determining, by the mobile device, the optimal file size to complete a transmission of the image within a predetermined time based on the at least one of connection bandwidth or connection latency.

6. The method of claim 1, wherein the optimal file size is between about 40% and 60% of the file size.

7. A computer-based system, comprising:
    a mobile device processor;
    a non-transitory memory configured to communicate with the processor, the non-transitory memory having instructions stored thereon that when executed by the processor cause the computer-based system to perform operations comprising:
    capturing, by the processor, an image comprising a file size;
    determining, by the processor, an optimal file size for the image based on at least one of a connection bandwidth or a connection latency between the processor and a server;
    compressing, by the processor, the image into a compressed image having a compressed file size less than or equal to the optimal file size;
    transmitting, by the processor, the compressed image to the server for storage;
    receiving, by the processor device, an address of the compressed image from the server;
    downloading, by the processor, the compressed image from the address received from the server; and
    displaying, by the processor, the compressed image.

8. The computer-based system of claim 7, further comprising receiving, by the processor, the compressed image, wherein the compressed image is transmitted by the server.

9. The computer-based system of claim 7, further comprising receiving, by the processor, the compressed image, wherein the compressed image is transmitted by a second mobile device.

10. The computer-based system of claim 7, determining the optimal file size further comprises:
    measuring, by the processor, the at least one of connection bandwidth or connection latency of a connection with the server; and
    determining, by the processor, the optimal file size to complete a transmission of the image within a predetermined time based on the at least one of connection bandwidth or connection latency.

11. The computer-based system of claim 7, wherein the determining the optimal file size further comprises:
    measuring, by the processor, the at least one of connection bandwidth or connection latency of a connection with a second mobile device; and
    determining, by the processor, the optimal file size to complete a transmission of the image within a predetermined time based on the at least one of connection bandwidth or connection latency.

12. The computer-based system of claim 7, wherein the optimal file size is between about 40% and 95% of the file size.

13. A non-transitory computer program product having computer-executable instructions stored thereon that, if executed by a mobile device, causes the mobile device to be capable of performing operations comprising:
    capturing, by the mobile device, an image comprising a file size;
    determining, by the mobile device, an optimal file size for the image based on at least one of connection bandwidth or a connection latency between the mobile device and a server;
    compressing, by the mobile device, the image into a compressed image having a compressed file size less than or equal to the optimal file size;
    transmitting, by the mobile device, the compressed image to the server for storage;
    receiving, by the mobile device, an address of the compressed image from the server;
    downloading, by the mobile device, the compressed image from the address received from the server; and
    displaying, by the mobile device, the compressed image.

14. The computer program product of claim 13, further comprising receiving, by the mobile device, the compressed image, wherein the compressed image is transmitted by the server.

15. The computer program product of claim 13, further comprising receiving, by the mobile device, the compressed image, wherein the compressed image is transmitted by a second mobile device.

16. The computer program product of claim 13, wherein the determining the optimal file size further comprises:
    measuring the at least one of connection bandwidth or connection latency of a connection with the server; and
    determining the optimal file size to complete a transmission of the image within a predetermined time based on the at least one of connection bandwidth or connection latency.

17. The computer program product of claim 13, wherein the determining the optimal file size further comprises:
    measuring, by the mobile device, the at least one of connection bandwidth or connection latency of a connection with a second mobile device; and
    determining, by the mobile device, the optimal file size to complete a transmission of the image within a predetermined time based on the at least one of connection bandwidth or connection latency.

* * * * *